United States Patent [19]

Falco

[11] Patent Number: 5,071,331
[45] Date of Patent: Dec. 10, 1991

[54] MOLD FOR FOAM PRODUCTS

[75] Inventor: Robert N. Falco, Indianapolis, Ind.

[73] Assignee: Cabot Safety Corporation, Southbridge, Mass.

[21] Appl. No.: 572,668

[22] Filed: Aug. 27, 1990

[51] Int. Cl.$^5$ .................. B29C 29/36; B29C 45/34
[52] U.S. Cl. .................. 425/4 R; 249/120; 249/121; 249/134; 249/141; 249/204; 425/812
[58] Field of Search ............... 249/120, 121, 204, 141, 249/134, 139, 127, DIG. 4, 126; 211/71, 76, 84, 83; 220/23.8, 523, 524, 526; 425/4 R, 817 R, 183, 812

[56] References Cited

U.S. PATENT DOCUMENTS

| | | | |
|---|---|---|---|
| 1,471,793 | 10/1923 | Israel | 220/524 |
| 1,705,328 | 3/1929 | Griffith | 249/120 |
| 1,873,081 | 8/1932 | Von Witzki | 249/120 |
| 1,964,476 | 6/1934 | Newman | 249/120 |
| 2,166,560 | 7/1939 | Schmelzer | 249/121 |
| 2,469,067 | 5/1949 | Follin | 249/120 |
| 2,946,207 | 7/1960 | Hulterstrum | 249/121 |
| 3,127,457 | 3/1964 | Di Pinto | 249/114.1 |
| 3,656,730 | 4/1972 | Hogben et al. | 249/134 |
| 3,838,955 | 10/1974 | Dubbeld | 249/134 |
| 4,239,175 | 12/1980 | Straubinger | 249/92 |
| 4,944,483 | 7/1990 | Nishizawa | 249/121 |

*Primary Examiner*—Jay H. Woo
*Assistant Examiner*—Khanh P. Nguyen
*Attorney, Agent, or Firm*—Michelle B. LaRoche

[57] ABSTRACT

An improved mold for forming foam products is provided with replaceable mold inserts which can be inserted into a mold block. The mold inserts have a cavity in which the product is foamed. The mold inserts are formed from a stick resistant material. Cap members having vent channels provided therein are adapted to fit into the mold insert. The number and size of vent channels is determined by the desired size and density of the molded foam product.

7 Claims, 1 Drawing Sheet

MOLD FOR FOAM PRODUCTS

BACKGROUND OF THE INVENTION

1. Field of the Invention

This invention relates to the field of molds for making foam products, and more particularly to the field of non-stick molds for making polyurethane foam products, such as disposable earplugs.

2. Description of the Prior Art

Molded polyurethane foam products are usually formed in a mold having one or more cavities provided therein to give the foamed product its molded shape. In normal operation, the foam precursor Components are placed in each mold cavity and a cover is applied to the mold. The foam components react to form the foam. As the foam expands, it conforms to the shape of the mold cavity,, thereby forming a foamed product of a desired shape.

A problem generally encountered when forming molded foam products is the inability of the molded product to be easily removed from the mold. Typically, mold release agents must be applied to the mold cavities prior to the introduction of the precursor foam components. These mold release agents permit the molded foam product to be easily removed from the mold.

Although the mold release agent may assist the removal of the molded foam product, the agent may create undesirable side effects. The mold release agent may react with either the foam components or the molded foam product or leach into the molded foam product and affect the properties of the product. When the foam product has been selected because of desirable properties, the leaching of the mold release agent into the product may substantially change those desired properties. Such is true in the case of molded foam earplugs in which the mold release agent may impart undesirable plasticization effects to the earplug. Consequently, there is a need for a mold which will permit the easy removal of a foamed product without the need for mold release agents.

Repeated use of a mold may result in deterioration of the mold cavity. When that occurs the mold must be replaced. Sometimes, the mold is scratched during use, which scratches frequently occur near the edge of the mold cavity. If a scratch occurs at the edge of a mold cavity, the desired seal between the top and bottom of the mold is broken but the mold cavity is otherwise useful. Yet, the absence of a proper seal makes the mold ineffective. Such a mold must be repaired or destroyed. Many molds are quite expensive. There is a need for a mold which can be replaced inexpensively and which has the strength, compatibility and other desirable properties of molds currently in use. There is also a need for a mold having an elastomeric cap for each mold cavity which will conform to the edge of the cavity and seal any scratches that are present on the edge.

SUMMARY OF THE INVENTION

I provide a mold, preferably a two-piece mold, for foam products which has a special resistance to sticking, particularly to polyurethane. Although the stick-resistant material allows easy release of the molded foam product, the cost of the material renders it impractical for construction of a mold block. Consequently, I provide a plurality of replaceable mold inserts formed of the stick-resistant material such as PFA Teflon fluorocarbon resin which can fit within cavities provided in the bottom of a mold made of a less expensive material. In such a manner, the amount of the expensive stick-resistant material used is minimized.

The top of the mold is provided with cap members which are positioned to cover the mold inserts when the top and bottom of the mold are brought together. The caps are made from a more expensive stick-resistant material and inserted into the top which is made from an inexpensive plastic or metal. The cap members are sized to tightly fit within the mold inserts, thereby forming a sealed mold. I prefer to use an elastic or viscoelastic material for the cap which enables the cap to conform to the lip of the insert and fill any scratches which may be present. Vent channels are provided in the cap member as needed to control the air flow out of the mold. The size and number of vent channels are determined by the desired size and density of the foamed product.

DESCRIPTION OF THE PREFERRED EMBODIMENT

Figure 1:
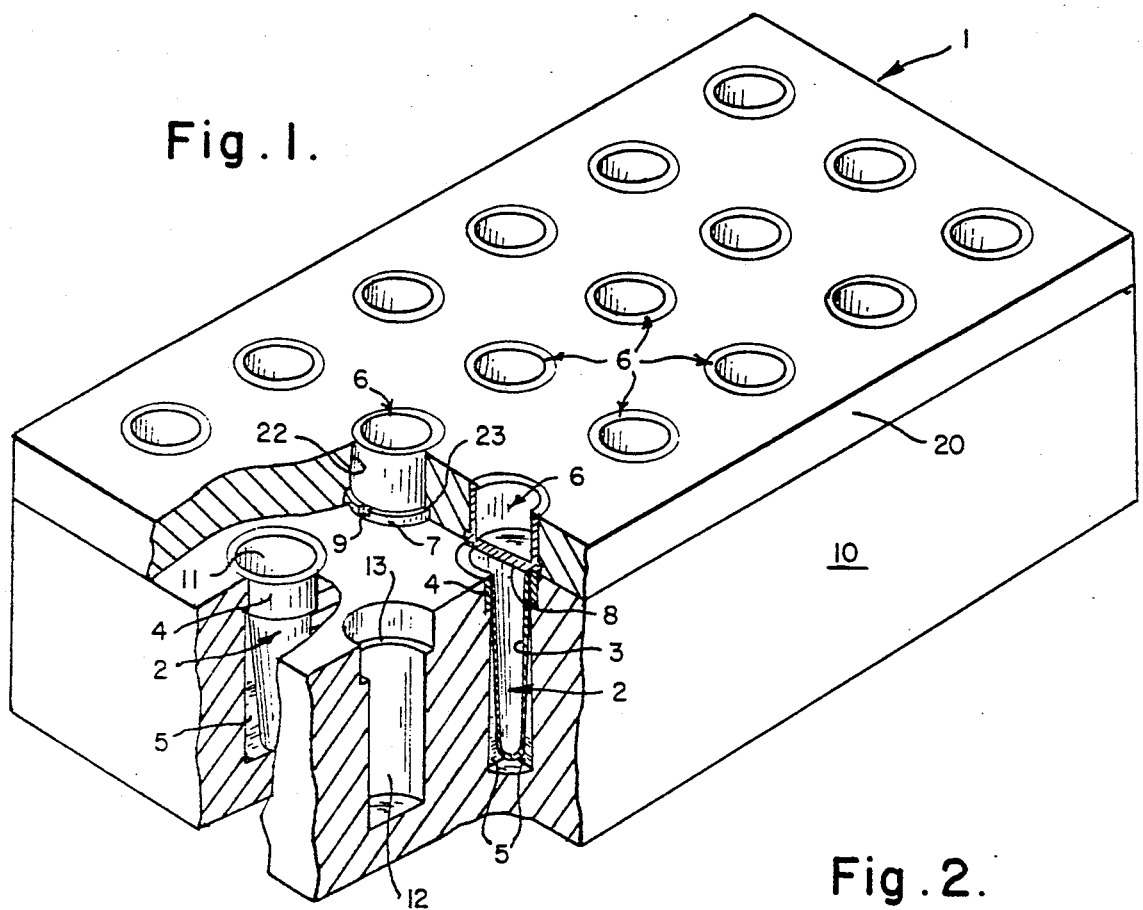
FIG. 1 is a perspective view partially in section of a presently preferred embodiment of the invention.
Figure 2:
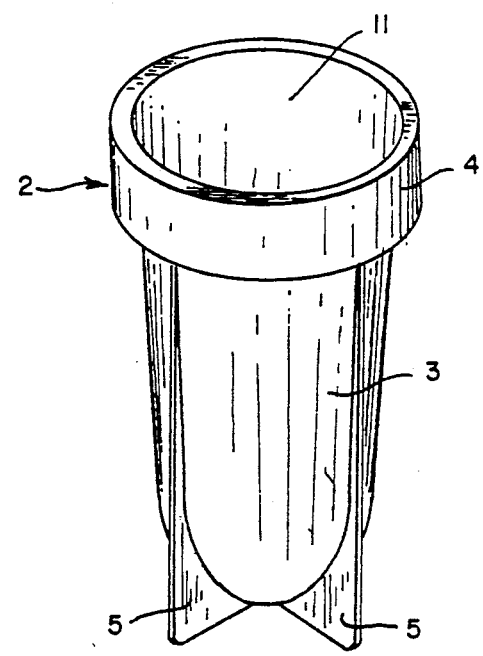
FIG. 2 is a perspective view of the mold insert used in the presently preferred embodiment of FIG. 1.
Figure 3:
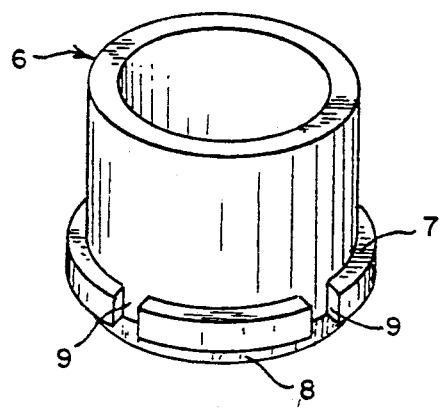
FIG. 3 is a perspective view of a cap member used in the presently preferred embodiment of FIG. 1.

As shown in FIG. 1, I provide a two piece mold 1 having a bottom 10 and top 20. Cavities 12 are provided in a spaced-apart relationship within the bottom 10. Corresponding cavities 22 are provided in top 20. When the mold is closed, cavities 22 will be aligned with cavities 12.

Both halves 10 and 20 can be formed from any inexpensive abrasion and wear resistant material. Because of its cost and abrasion and wear resistance, I prefer to use an ultra high molecular weight polyethylene as the material for my mold. I have found that Hoechst ultra high molecular weight polyethylene works well.

I provide a mold insert 2 that is resistant to sticking to polyurethane. Insert 2 includes base portion 3 and collar 4 which define a mold cavity. Although I have shown a bullet shaped mold cavity 11, it should be understood that the mold cavity could be another shape. An insert 2 is placed in each cavity 12 in bottom 10. Collar 4 is sized t he somewhat larger than the main portion of the cavity 12 so that the mold insert rests on a shoulder 13 in the cavity 12. I also prefer to provide ribs 5 on the exterior of the insert 2 to support the insert within cavity 12. These ribs 5 facilitate insertion and removal of the insert 2. Mold insert 2 is formed from any material which is resistant to sticking to polyurethane foam materials. I prefer to use a tetrafluoroethylene fluorocarbon resin for the mold insert and in particular PFA TEFLON ® fluorocarbon resin (DuPont de Nemours, Wilmington, Del.). This material is more expensive than the material used to form the mold halves 10 and 20.

Because mold insert 2 is resistant to sticking to polyurethane materials, no release agent must be added to the mold prior to introduction of the polyurethane foam components. This eliminates the problem of a mold release agent imparting undesirable properties to the molded polyurethane product. By using the PFA Teflon fluorocarbon resin material, the molded polyurethane foam product will not adhere to the sides of the mold insert and will release easily after formation. During use the insert may deteriorate. When that occurs it is a simple and inexpensive task to replace the insert.

Cap member 6 which is provided in cavity 22 in the top 20 of my mold. Cap 6 is inserted into cavity 22 until cap collar 7 rests on a shoulder 23 within the cavity. A base portion 8 is sized so that it will fit within collar 4 of mold insert 2. Cap Collar 7 will stop the ingress of cap member 6 into mold insert 2 and will form a seal with a collar 4 of insert 2 except at vents 9.

Cap member 6 can be formed from any material having good release properties that will make a good seal in mold insert 2. I prefer to use C-flex brand thermoplastic elastomer, which is a Kraton based silicon/polyethylene blend material. A cap made of this material will conform to and seal the mating edge of the insert even if that edge is scratched.

Vent channels 9 are provided along the circumference of collar 7. Vent channels 9 are sized and numbered to permit air to escape from the mold cavity 11 during foaming and so that desired physical properties are imparted to the foam product. By adjusting the number and size of vent channels 9, one can control the size and density of the molded foam product.

Instead of constituting a separate member, cap member 6 may be alternatively formed integral with top 20. However, I prefer the use of a separate cap member 6 because it has the advantage of being replaceable. If an integral cap member were to deteriorate, the entire top block 20 would need to be replaced. When a separate cap member 6 is used, only the disfunctional cap member needs to be replaced.

Additionally, the preferred materials used to construct mold insert 2 and cap member 6 are more expensive than the cheaper plastic used in mold halves 10 and 20. The cost to make an entire mold block out of a material that is resistant to sticking to polyurethane is prohibitive. By utilizing the mold inserts 2 and caps 6, the more expensive material is localized to those positions where it is needed.

The second advantage of using separate mold inserts 2 and Cap members 6 is in the repair of the mold assembly. When a mold insert 2 falls into disrepair, it need only be removed from mold bottom 10. A new mold insert 2 can then be used in its place. The use of replaceable and insertable mold inserts 2 and cap members 6 thus increases the life of the mold assembly.

I have found that even the Teflon fluorocarhon resin mold inserts 2 will eventually lose their resistance to sticking to polyurethanes. This loss of effectiveness over time is apparently due to mechanical abrasion of insert 2 with extended use. When a mold insert 2 loses its effectiveness, it need only be replaced with a new mold insert 2.

Machined plastic molds, including those made of Teflon fluorocarbon resins, have been found to have limited life. An examination of scanning electron micrographs of the interior surface of such molds revealed that failure was caused by mechanical attachment of the foam to surface fibers caused by machining and enlarged through repeated mechanical pulling of the foam from the cavities. I have eliminated this cause for failure by forming a highly smooth surface. That surface is devoide of fibers or locations for mechanical attachment by the foam. The surface may be a pebble grain surface or have other relative large surface irregularity of a type that the foam cannot mechanically grab. Although this highly smooth surface could be formed in other ways, I prefer injection molded inserts, with P.F.A. Teflon fluorocarbon resins as the preferred material. The surface of such molded inserts is very smooth eliminating failure except that which may inadvertently be caused by abrasion coming into play during processing.

The present invention is particularly suited to a two piece mold of the type shown in the drawings. However, those skilled in the art will recognize that the top, bottom, cap and insert could be made in two or more pieces.

Although I have described the present invention with respect to its applicability to polyurethane foam products, it is to be understood that the same principles can be applied to other foam materials. While I have shown and described a present preferred embodiment of the invention, it is to be distinctly understood that the invention is not limited thereto but may be otherwise variously embodied and practiced within the scope of the following claims.

I claim:
1. A mold for foam products comprising:
   a. a bottom provided with a plurality of spaced apart bottom cavities;
   b. a plurality of replaceable mold inserts fitted within said bottom cavities, said mold inserts adapted to receive precursor foam components, said mold inserts constructed of a material which is resistant to sticking to said foam; and
   c. a top provided with a plurality of spaced apart cap members, said cap members sized and positioned to cover said mold inserts when said top and said bottom are brought securely together, said cap members having at least one vent
   wherein said top further comprises a plurality of spaced apart top cavities having said cap members inserted thereon.

2. The mold of claim 1 wherein said foam is polyurethane and said mold insert is formed from a fluorocarbon resin-based material.

3. The mold of claim 1 wherein said caps are removable from the top.

4. The mold of claim 1 wherein said cap members are made of a thermoplastic elastomer.

5. The mold of claim 1 wherein said insert material is a tetrafluoroethylene fluorocarbon resin.

6. The mold of claim 1 wherein said inserts have a highly smooth interior surface.

7. The mold of claim 1 wherein said inserts have at least 1 rib on its exterior surface.

* * * * *

UNITED STATES PATENT AND TRADEMARK OFFICE
CERTIFICATE OF CORRECTION

PATENT NO. : 5,071,331
DATED : December 10, 1991
INVENTOR(S) : Robert N. Falco

It is certified that error appears in the above-indentified patent and that said Letters Patent is hereby corrected as shown below:

Column 2, line 48 "sized t he somewhat" should read --sized to be somewhat --.

Column 4, line 45, "thereon" should read --therein --.

Signed and Sealed this

Thirteenth Day of July, 1993

Attest:

MICHAEL K. KIRK

*Attesting Officer*     *Acting Commissioner of Patents and Trademarks*